Figure 1:
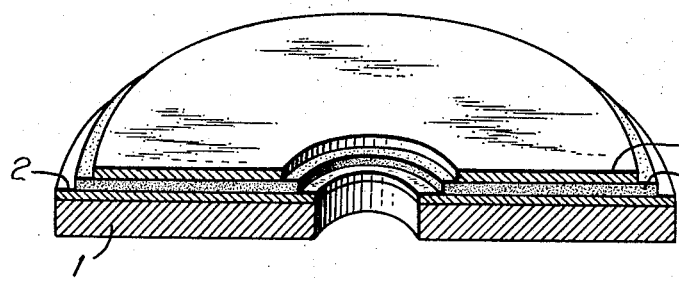

Nov. 10, 1959     R. M. DOBROWOLSKI ET AL     2,912,353
SELENIUM RECTIFIER
Filed Jan. 3, 1956

INVENTORS
RAYMOND M. DOBROWOLSKI
DONALD C. SEELEY
BY Henry Kolin
AGENT

United States Patent Office 2,912,353
Patented Nov. 10, 1959

2,912,353

SELENIUM RECTIFIER

Raymond M. Dobrowolski, Clifton, and Donald C. Seeley, Verona, N.J., assignors to International Telephone and Telegraph Corporation, Nutley, N.J., a corporation of Maryland Application January 3, 1956, Serial No. 556,951

3 Claims. (Cl. 117—200)

This invention relates to improvements in selenium rectifiers and more particularly to the introduction of a novel admixture to selenium for improving the rectification ratio of a selenium rectifier.

Pure selenium has a resistivity which is considered too high for use in making selenium rectifiers. To increase the conductivity of the selenium, many substances have been proposed for incorporation therein. However, it has been found that frequently the increase in conductivity of the selenium is obtained at the expense of the reverse resistance, which drops, thereby often resulting in a more unfavorable rectification ratio than untreated selenium. Thus, in the article entitled "Influence of Admixtures to Selenium on the Electrical Properties of Selenium Rectifiers," by N. A. Penim and K. V. Astakhov, which appeared in the "Journal of Technical Physics" (U.S.S.R.), volume 16, pages 199–206 (1946), a study was reported on the effect of admixtures of selenides of copper, silver, nickel, iron, zinc, cadmium, mercury, tin, lead, arsenic, antimony and bismuth to highly purified selenium. It was found that in all instances the rectification ratios of selenium rectifiers prepared from the treated selenium were poorer than those of rectifiers using pure selenium. In other studies, the effect upon the conductivity of admixtures to selenium was determined. Thus, B. Lizell reported on "The Electrical Conductivity of Liquid Selenium and Selenium-Tellurium Mixtures" in an article which appeared in "The Journal of Chemical Physics," volume 20, pages 672–676 (1952). His results, however, were inconclusive and of theoretical interest only.

At present, halogens in various forms are commonly added to selenium for increasing its conductivity. However, the use of these halogens as admixtures to selenium has several drawbacks and represents, in essence, a compromise between obtaining an improvement in the forward conductivity of the rectifier at the expense of a deteriorated reverse or blocking voltage.

It is an object of the present invention to provide a selenium rectifier containing a novel selenium layer.

It is a further object to provide a selenium rectifier having a higher rectification ratio than those known heretofore.

It is still an additional object to provide a method for preparing such improved rectifiers.

It is a feature of this invention that tellurium, together with a halogen, is incorporated in selenium for obtaining a semiconductive element for use in a selenium rectifier.

It is a more specific feature of this invention that tellurium is added to a halogen-containing selenium in a concentration between 20 and 200 parts tellurium per million parts selenium, by weight.

Figure 2:
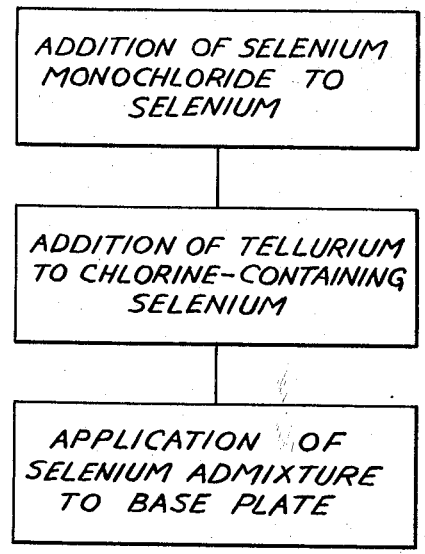

The above-mentioned and other features and objects of this invention will become more apparent by reference to the following description taken in conjunction with the accompanying drawing, in which:

Fig. 1 represents a cross section of a rectifier showing an embodiment of this invention; and Fig. 2 represents a flow chart of the essential features of one embodiment of the process of this invention.

The preparation of selenium rectifiers has been described heretofore, for example, in the copending application of D. F. Allison, Serial No. 395,359, filed December 1, 1953, and the description contained therein may be considered for purposes of illustration as taken in conjunction with the description contained herein.

Referring to Fig. 1, the base plate element 1 may consist of any of the various metals used for this purpose such as iron, magnesium, aluminum, nickel or bismuth. Preferably, the base plate 1 consists of aluminum having a layer 2 of nickel thereon. The selenium layer 3 may be deposited upon the nickel-plated base by any of various methods, as described in the above-mentioned Serial No. 395,359. The selenium contains a halogen, added in elemental or combined form, such as bromine, iodine, chlorine or mixtures thereof for purposes of increasing the conductivity of the selenium. Various amounts up to 1,000 parts halogen per million parts selenium by weight have been found suitable in this regard. In general, we prefer to add chlorine having a concentration between 100 and 200 parts chlorine, most specifically 100 parts chlorine per million parts by weight of selenium, and preferably added in the form of selenium monochloride. To this chlorine-containing selenium is then added tellurium, which is uniformly dispersed throughout the selenium. Various methods may be used for adding the tellurium to the chlorine-containing selenium. The chlorine-containing selenium may be in the form of a fine powder, and the tellurium, also in a powdered form, may be added to the chlorine-containing selenium and intimately mixed therewith; thereby a uniform mechanical mixture is obtained. Or preferably, after addition of the tellurium powder to the chlorine-containing selenium powder, the mixture is brought to a molten state, and, after cooling, the solidified melt is pulverized and ground to a fine powder. As an alternative method of adding tellurium, the requisite amount of tellurium is ground together with selenium free from any other additives, preferably both in the form of a powder, and the mixture is brought into a molten state, cooled, and the solidified melt ground and pulverized. To this tellurium-containing selenium may be then added a halogen, either in elemental or combined form, such as selenium monochloride. This material may then be remelted and the melt ground into a fine powder.

The treated selenium containing both the halogen and the tellurium is deposited on the base plate, preferably in the form of a fine powder. The selenium is then adhered to the base plate by pressing it thereon at a desired temperature, and the plate is further treated for a fixed period of time at an elevated temperature below the melting point of the selenium but in the vicinity thereof, such as 215° C., to crystallize the selenium and bring it to its conductive crystalline form. This treatment is referred to as the second heat treatment. An optional insulating layer, either of genetic or non-genetic type, may then be formed or deposited on the selenium surface, and a counter electrode 4 deposited thereon. Cadmium or various known alloys thereof are preferred as counter-electrode compositions. The rectifier may then be electroformed in a customary manner. The novel electroforming process as set forth in Serial No. 395,359 may also be practiced with the subject invention.

It has been found that, in adding tellurium to a halogen-containing selenium, rectifiers may be obtained having a marked improvement in rectification ratio and in forward conductivity. Various rectification ratios may be employed for purposes of comparing the performance of selenium rectifiers. One such ratio may be obtained, for a fixed area of surface, by dividing the forward current at an applied voltage of 1.4 volts alternating current by the reverse-current leakage at a fixed power dissipation of 74 milliwatts per square centimeter. The improvement in rectification ratio obtained herein is a result of an increase both in the forward conductivity of the rectifier cell and in the reverse or blocking voltage of the cell. As an example of improvement in the forward conductivity of cells processed from the tellurium-doped selenium, it has been found that the initial forward current of cells, that current observed before electrical forming, is improved by more than 70 percent compared with that of cells processed from selenium containing chlorine only as the additive. It was found that where the second heat treatment was maintained between 15 and 17 minutes at a temperature just below the melting point of selenium an even more marked improvement was obtained, namely, an improvement of more than 120 percent in initial forward current. After controlled peak-power forming, the final forward current for tellurium-doped cells was found to show an improvement of more than 40 percent compared with that of cells processed from selenium containing only chlorine. Where a second heat treatment of from 15 to 17 minutes was used, more than a 200 percent improvement in forward conductivity was obtained. The reverse voltages of the cells containing tellurium were also found to show an improvement for the standard heat treatment of 35 minutes at a temperature just below the melting point of the selenium. For the 15- to 17-minute heat treatment, the reverse voltages showed a slight decline. These reesults are summarized in tabular form as shown below.

|  | Relative Forward Current Before Electrical Forming | | Relative Forward Current After Electrical Forming | | Relative Reverse Voltage After Electrical Forming | |
| --- | --- | --- | --- | --- | --- | --- |
| Heat treatment | 15-17 min. | 35 min. | 15-17 min. | 35 min. | 15-17 min. | 35 min. |
| Se+Cl | 1.0 | 1.0 | 1.0 | 1.0 | 1.0 | 1.0 |
| Se+Cl+Te | 2.2 | 1.7 | 3.15 | 1.4 | 0.6 | 1.3 |

It has been found that the amount of tellurium added is related to the amount of halogen present. Apparently, a synergistic coaction occurs between the tellurium and chlorine inasmuch as adding tellurium by itself to chlorine-free selenium results in but little, if any, improvement in electrical properties of the cell. For a concentration of 100 parts chlorine, added as selenium monochloride, per million parts selenium, it is desirable that the tellurium concentration not exceed 100 parts tellurium per million parts selenium. The weights above specified are all calculated as weights based on the weight of pure selenium. A concentration between 20 and 200 parts tellurium, most specifically 100 parts tellurium, per million parts selenium has been found particularly desirable for the practice of this invention. It should be noted that the tellurium may be added to the selenium concurrently with addition of the halogen, before addition of the halogen or, preferably, as shown in Fig. 2, after the halogen has already been incorporated in the selenium.

While we have described above the principles of our invention in connection with specific materials and method steps, it is to be clearly understood that this description is made only by way of example and not as a limitation to the scope of our invention as set forth in the objects thereof and in the accompanying claims.

We claim:

1. A process of preparing a selenium rectifier having a base plate, a layer on said base plate, and a counter electrode over said layer, said layer on said base plate consisting of selenium containing an admixture of chlorine and tellurium, which comprises depositing the selenium containing said admixture as a layer on the base plate, maintaining said base plate at a temperature below the melting point of selenium and in the vicinity of 215° C. for 15 to 17 minutes, and depositing a counter electrode over said layer at a temperature substantially lower than said melting point of selenium.

2. A process according to claim 1, wherein the tellurium is present in an amount between 20 and 200 parts tellurium per million parts selenium by weight.

3. A process according to claim 1, wherein the chlorine is present in an amount between 20 and 200 parts chlorine per million parts selenium by weight.

References Cited in the file of this patent

UNITED STATES PATENTS 2,349,622    Hewlett    May 23, 1944
2,736,850    Lidow    Feb. 28, 1956